United States Patent [19]

Kuni et al.

[11] 4,095,905

[45] Jun. 20, 1978

[54] SURFACE-DEFECT DETECTING DEVICE

[75] Inventors: Asahiro Kuni, Tokyo; Nobuyuki Akiyama, Yokohama, both of Japan

[73] Assignee: Hitachi, Ltd., Japan

[21] Appl. No.: 715,218

[22] Filed: Aug. 17, 1976

[30] Foreign Application Priority Data

Aug. 20, 1975 Japan ............................... 50-100210
Oct. 17, 1975 Japan ............................... 50-124395

[51] Int. Cl.² ............................................. G01N 21/32
[52] U.S. Cl. ................................... 356/200; 250/572;
350/296; 356/210; 356/237
[58] Field of Search ....................... 250/562, 571, 572;
350/293, 296, 299; 356/199, 200, 210, 237, 238

[56] References Cited

U.S. PATENT DOCUMENTS 2,220,488  11/1940  Lott ...................................... 250/571
3,266,313  8/1966   Litterst ................................ 350/296

Primary Examiner—John K. Corbin
Attorney, Agent, or Firm—Craig & Antonelli

[57] ABSTRACT

A surface-defect detecting device including: illuminating means for illuminating a minute peripheral or annular zone on the surface of a material to be inspected, such as the circumferential surface of a cylindrical body; at least a pair of reflecting mirrors having ellipsoidal or spheroidal surfaces and first focal points positioned at the minute annular zone so as to focus the light reflecting from the aforesaid minute annular zone on the circumferential surface of the body; and photoelectric elements positioned at second the other focal points of the reflecting mirrors, respectively; whereby when a defect is not present in the minute annular zone on the circumferential surface of the body, the light is regularly reflected on the surface of the body to be inspected, so as not to be received by the photoelectric elements, and on the other hand, when a defect is present on the minute annular zone on the circumferential surface of the body, the light is irregularly reflected on the minute annular zone to be received by photoelectric elements, so that the body may be inspected for a defect on its surface according to signals obtained from the photoelectric elements, and the defect thus detected may be determined for its size.

26 Claims, 7 Drawing Figures

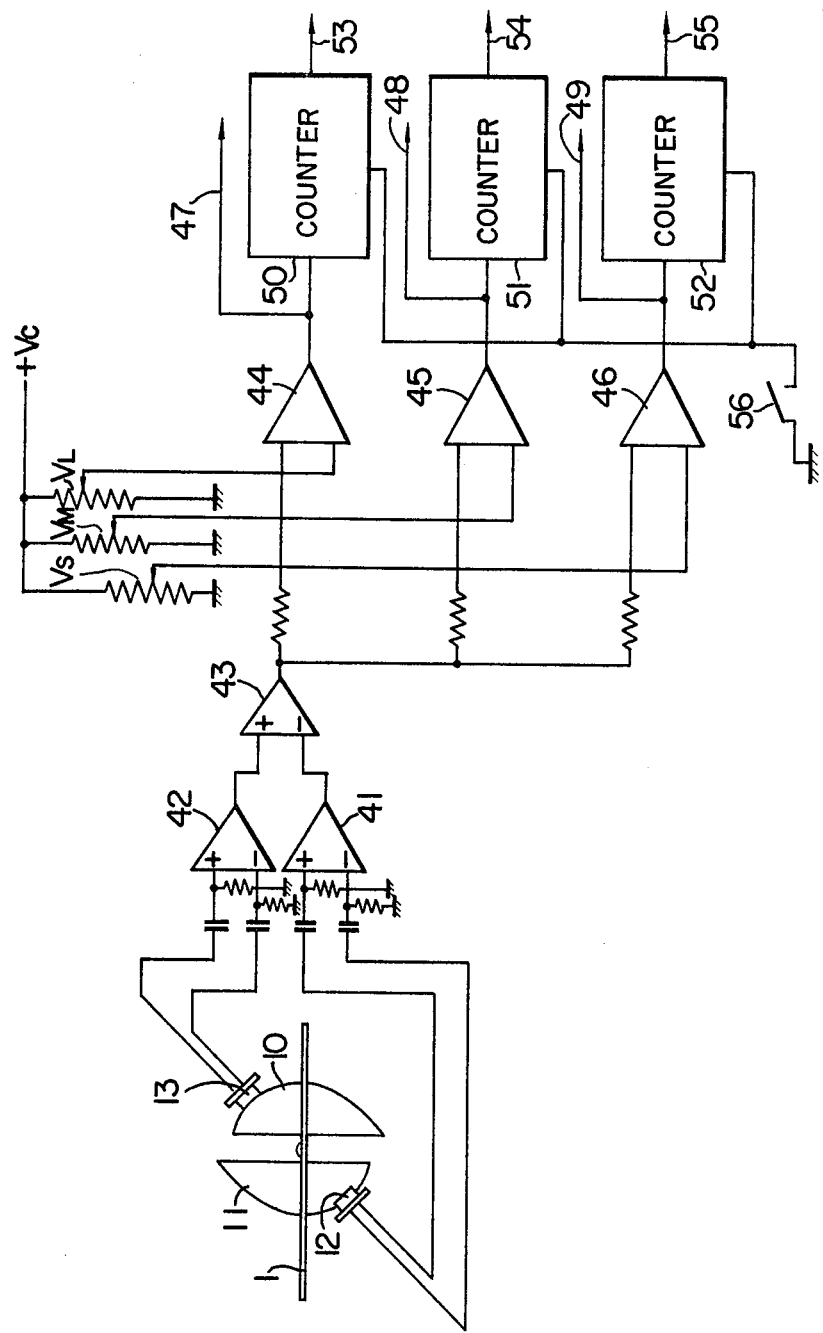

SURFACE-DEFECT DETECTING DEVICE

This invention relates to a surface-defect detecting device for optically detecting damages in or foreign matters sticking to the surface of a material to be inspected.

One of the prior art methods for use in inspection for damages in or, foreign matters sticking to the surface of a material, which are continuous one-dimensionally, is a mechanical one which is to detect irregularity on the surface due to the presence of damages or foreign matters thereon by using piezoelectric elements which are maintained in contact with the surface of a material being inspected. However, this attempt poses problems in vibration of a material being inspected, mechanical service life of a detector, and capability for detecting minute defects.

Another method is to optically detect damages and the like by illuminating the surface of a material following a spot or slit-like pattern, thereby detecting by photoelectric elements a variation in intensity of reflecting light from the aforesaid damages in or foreign matters sticking to the surface of the material being inspected. The latter attempt is successful in a sense to inspect a material at a high accuracy, while still suffering from the shortcomings as are experienced with the former attempt, i.e., a plurality or detecting elements should be arranged in a plane perpendicular to the axis of a material being inspected so as to inspect the entire surface of a material, thus resulting in space, maintenance and cost problems.

It is a principal object of the present invention to provide a surface-defect detecting device which may save space and is simple in construction, without sacrificing the surface-defect detecting capability and reliability of the device.

It is another object of the present invention to provide a surface-defect detecting device which may detect a defect on the surface of a material being inspected, by feeding a material through holes provided in reflecting mirrors continuously in one direction so as to allow inspection for a defect.

It is a further object of the present invention to provide a surface-defect detecting device which may inspect and determine a defect for its size according to the level of a signal from a photoelectric element or sensor.

It is a still further object of the present invention to provide a surface-defect detecting device which is provided with a simplified illuminating means for illuminating a minute annular zone on the circumferential surfce of a material being inspected.

According to the present invention, there is provided a surface-defect detecting device incorporating a principle that a minute peripheral or annular zone (circular or polygon in section) encompassing the surface of a material to be inspected is illuminated within a plane perpendicular to the axis of a material in every direction, and in case the aforesaid minute annular zone presents a uniform surface, then the light therefrom is regularly reflected thereon so as not to be received by photoelectric elements, and on the other hand, in case a damage or foreign matter is present on the minute annular zone, then the light therefrom is irregularly reflected in various directions in a manner that the reflecting light may be focused at first focal points of reflecting mirrors having ellipsoidal or spheroidal reflecting surfaces, with second focal points thereof being positioned at the aforesaid minute annular zone on the surface of the material being inspected, whereupon the light thus focused is received by photoelectric elements so as to convert the light into electric signals, thereby detecting a defect on the surface of a material being inspected. In addition, the present invention is directed to the inspection of a material whose surface may be inspected one-dimensionally continuously, while the material to be inspected is fed through a hole provided in one of the reflecting mirrors so as to arrive at one of the focal points of the other reflecting mirror and then fed out through a hole provided in the other reflecting mirror, thereby allowing continuous inspection of the surface of a material.

Still furthermore, according to the present invention, electric signals obtained from both the photoelectric elements ae amplified and then added, after which a signal thus added is thresholded with respect to a given level, so that when a signal exceeds a given level, then the surface of a material is regarded as including a defect, and when a signal is lower than the given level, then the surface of a material is regarded as including no defect.

Yet furthermore, according to the present invention, there is provided a surface-defect detecting device, which is directed to the inspection of a material provided in the form of a continuous line, and which provides an illuminating means including a light source, a focusing optical system adapted to focus the light from the light source on a minute annular zone on the surface of a material to be inspected, and a pair of reflecting mirrors which are positioned on the side opposite to incident light from a focusing optical system with respect to a material being inspected, and inclined at about 60° to the optical axis of the aforesaid incident light, whereby the aforesaid minute annular zone on the surface of a material may be illuminated in every direction, following an annular pattern.

FIG. 7 is a view showing an outline of the arrangement of a signal processing circuit for signals fed from photoelectric elements shown in FIGS. 1, 2, and 5.

Figure 1:
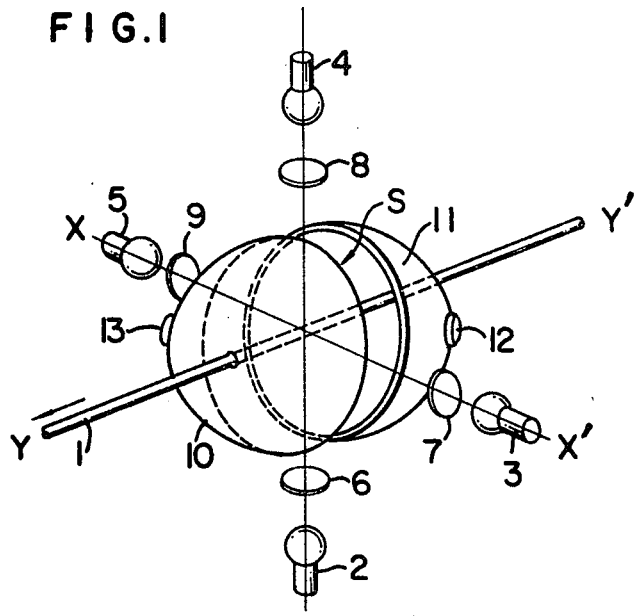
FIG. 1 shows one embodiment of a mirror and photoelectric element system in a surface-defect detecting device according to the present invention.
Figure 2:
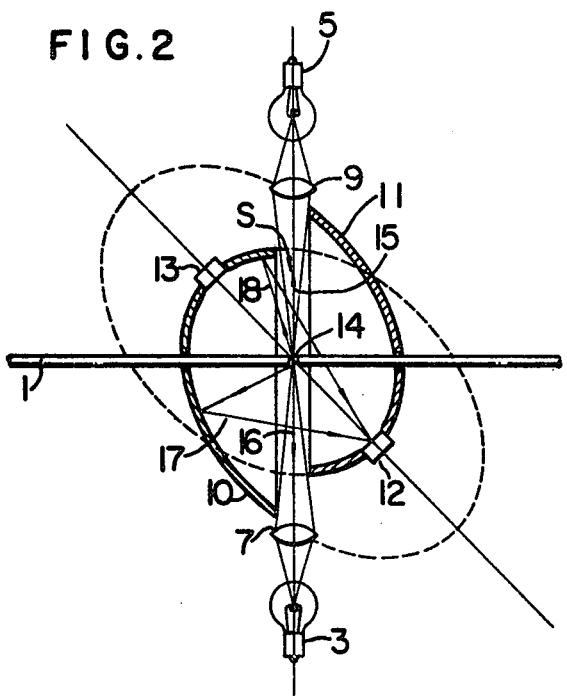
FIG. 2 is a horizontal cross sectional view of the embodiment of FIG. 1, as viewed from above.

Included by materials to be inspected according to the present invention are enamel wires 1 and the like which are continuous one dimensionally, and the inspection is directed to damages of foreign matters sticking to the surface of the enamel wire 1. Referring to FIG. 1, there is shown one embodiment of a surface-defect detecting device according to the present invention. The light from light sources 2, 3, 4, 5 is focussed through lenses 6, 7, 8, 9 on a minute annular zone on the surface of the enamel wire 1. The refecting light from the aforesaid minute annular zone is focused on the surfaces of photoelectric elements 12, 13 by means of ellipsodial or spheroidal surfaces (defined by the rotation of a part of an ellipse) or mirrors 10, 11. For better understanding, the light sources 2, 3, 4, 5 are arranged radially around the enamel wire 1 as shown in FIG. 1. As an alternative, a single light source may be used and the light from the light source is directed through a known focussing system, such as lenses, mirrors or optical fibers so as to be focused on a minute annular zone on the surface of the enamel wire 1. It is mandatory that in case the cross section of a material, such as an enamel wire 1, is circular, illumination be given at least from three angular positions which are angularly spaced 120°, and that in case the cross section of a material to be inspected is of a polygonal shape having at least four sides, illumination be given from four angular positions which are spaced 90°. Referring to FIG. 2, there is shown a horizontal cross-sectional view of the embodiment, taken through a center thereof. In this figure, the light sources 2, 4 and lenses 6, 8 are omitted. The light from the light sources 2, 3, 4, 5 is focused on the minute annular zone on the entire circumferential surface of a material, i.e., an enamel wire 1. Meanwhile, the enamel wire 1 is fed in or out through holes provided in mirrors 10, 11 having the ellipsoidal or spheroidal surfaces. If the surface of the minute annular zone is smooth, then the light reflecting from the minute annular zone is regularly reflected within the same plane as that of incident light, providing reflecting light 15, 16. Accordingly, there is provided a gap S between the spheroidal mirrors 10, 11 so as to pass incident light and reflecting light 15, 16 therethrough. Meanwhile, the aforesaid gap may be a space through which light is directed outside or may be replaced by a black portion which absorbs a substantial amount of the light or do not reflect the light thereon i.e. the gap may be a non-reflecting portion.

On the other hand, in case a damage or foreign matter is present on the surface of a minute annular zone, then incident light is irregularly reflected thereon as reflecting light 17, 18 directed towards the spheroidal mirror 10, without escaping through the gap S. The surface of the mirror 10 is part of a spheroidal surface, while the remaining portion of the spheroidal surface, except for the reflecting surface, is shown by a broken line. The two focal points of the spheroidal surface of the mirror 10 lie in a minute annular zone 14 and a photoelectric element 12. Accordingly, the light from the minute annular zone 14 is necessarily focused on the photoelectric element 12. The same may be applied to a spheroidal mirror 11 and a photoelectric element or sensor 13.

Figure 3:
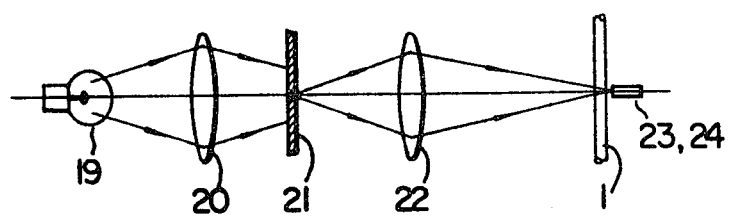
FIG. 3 is a front view of one embodiment of illuminating means in the surface-defect detecting device according to the present invention.
Figure 4:
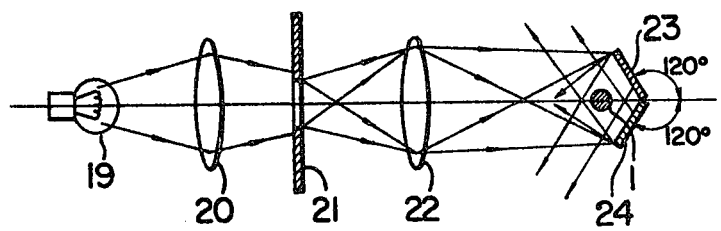
FIG. 4 is a plan view of FIG. 3.

FIGS. 3 and 4 show illuminating means for use in illuminating a minute annular zone on the surface of a material to be inspected in a surface-defect detecting device according to the present invention. The illuminating means consists of a light source 19, a first lens 20, a slit 21, a second lens 22, a material 1 to be inspected, and mirrors 23, 24. The light from the light source 19 is focused through the first lens 20 on the slit 21. The light past the slit 21 is focused through the second lens 22 so as to form an image of the slit 21. In this case, the second lens 22 is selected so as to provide an increased depth-of-focus for an image of the slit 21. The material 1 to be inspected is positioned immediately in the front of the aforesaid image, while the mirrors 23, 24 are positioned immediately in the rear of the aforesaid image. As shown in FIG. 4, the mirrors 23, 24 are positioned at an angle of ± 65° to the optical axis of incident light. Thus, the mirrors 23, 24 make an angle of 120°. In addition the widths of the mirrors 23, 24 are the same as that of an image of the slit 21. As shown in FIGS. 3, 4, the direction of the slit 21 is at a right angle to the axis of the material 1. Still furthermore, the width of slit 21 should be such that the width of an image of the slit 21 may coincide with a desired length of a minute annular zone on the surface of a material to be inspected, while the length of the slit 21 is at least three times as long as the diameter of the material 1. Part of an image of the slit 21 directly illuminates the side of material 1 on the side of a light source 19, while the remaining part of the image is reflected on mirrors 23, 24, illuminating the rear side of a minute annular zone in the directions making an angle of 120° to the optical axis.

As is apparent from the foregoing, the light from a single light source is focused on a minute annular zone on the surface of the material 1 in the directions which are angularly spaced 120°. In this case, the direction of the slit is set at a right angle to the axis of a material to be inspected, while the length of the slit is set such that the length of the slit is set such that the length of an image of the slit, which is focused on a material to be inspected, is at least three times as long as the diameter of the material 1. In addition, the width of slit is determined by the desired length of a material to be illuminated, when an image of the slit is focused on a material to be inspected. Positioned in the rear of a material to be inspected are two mirrors which are arranged following a 'V' shaped pattern so as to make an angle of ± 60° to the optical axis of incident light, the aforesaid mirrors having a width the same as that of an image of the slit. Thus, the light past without illuminating a material to be inspected is reflected on these mirrors, thereby illuminating the rear side of the material. Meanwhile, in the aforesaid embodiment, the slit 21 should not necessarily be provided, because it is possible that there is provided a lamp 19 whose filament is directed perpendicularly to the axial direction of a material to be inspected and the light emitted from the lamp 19 is focused so as to provide an image having a length of at least three times as long as the diameter of a material, through a first lens 20 and a second lens 22, without being directly condensed through the slit 21. In other words, even if the slit is omitted, it is possible to illuminate the entire minute annular zone on the surface of a material to be inspected.

Figure 5:
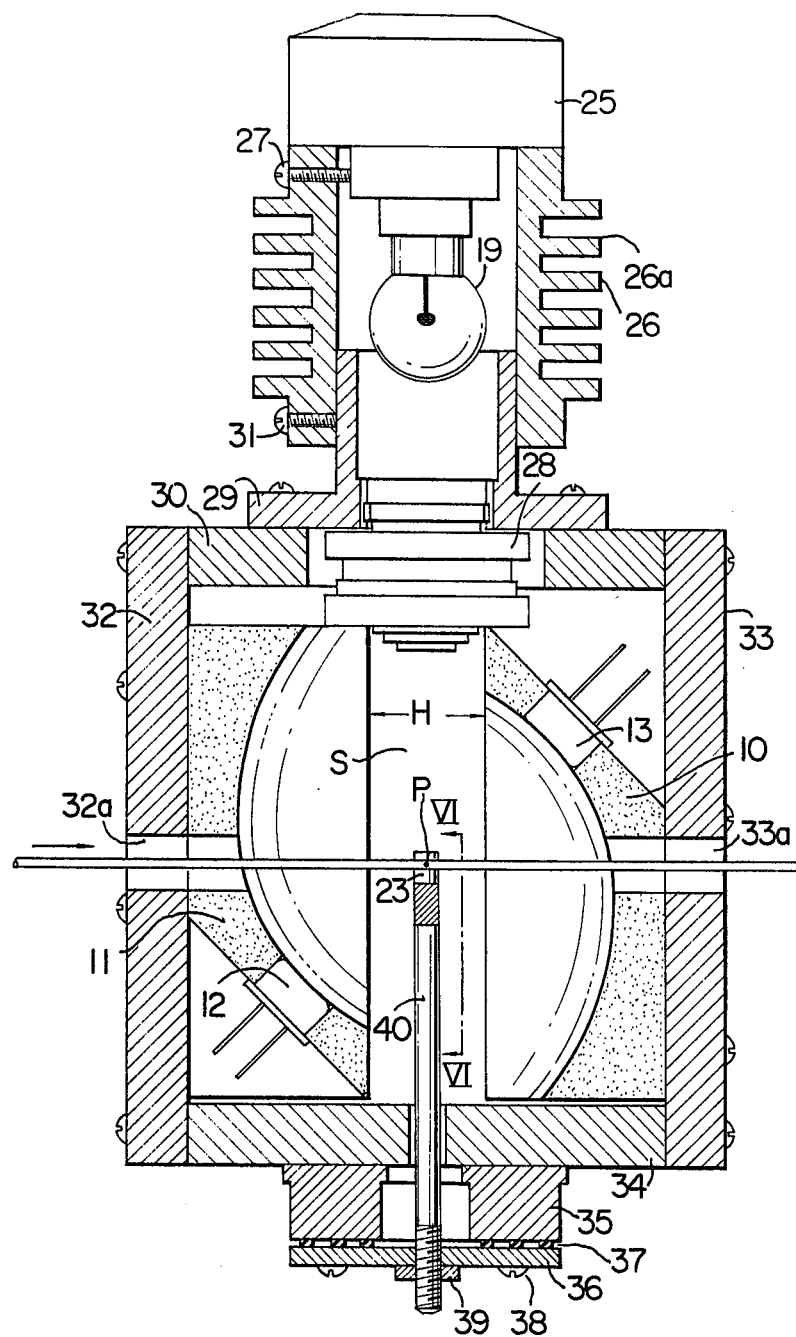
FIG. 5 is a horizontal cross-sectional view showing a embodiment of the surface-defect detecting device according to present invention.
Figure 6:
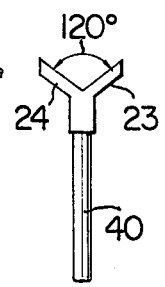
FIG. 6 is a cross-sectional view taken along the line A—A of FIG. 5.

Description will be given in more detail of the surface-defect detecting device provided with mirrors 10, 11 having spheroidal reflecting surfaces, and photoelectric elements 12, 13 shown in FIG. 2, and an illuminating device shown in FIGS. 3 and 4 (In this respect, the slit is omitted.) in conjunction with FIGS. 5 and 6. Shown at 25 is a socket adapted to mount a lamp 19 in a manner that the length of its filament is directed perpendicularly to the axis of an enamel wire 1. Shown at 26 is a cover which shields the light emitted from the light source 19 from leaking outside, with the socket 25 being secured to its top end by means of a screw 27. The cover 26 is formed with radiating fins 26a on its outer periphery. Shown at 28 is a focusing macro-lens which focuses the light from the light source 19 on the focal points, on one side, of the mirrors 10, 11 so as to provide an image having a length of five to six times as long as the diameter of the enamel wire 1. The focusing macro-lens 28 affords a function of the first lens 20 and the second lens 22 as shown in FIG. 4. Shown at 29 is a flange fastened to the top surface of a housing-top-surface bracket 30. The cover 26 is attached to the bracket 30 by means of a screw 31 in a manner to be movable along the optical axis. The focusing macro-lens 28 is secured to the flange 29, with a male thread thereof being in meshing relation to a female thread formed on the inner peripheral surface of the flange 29. Shown at 52, 53 are housing side-brackets which retain the two mirrors 10, 11 having spheroidal reflecting surfaces and focal points, on one side, which are positioned at a point P. Holes 32a, 33a are provided in the mirrors 10, 11 in their centers so as to allow feeding-in or-out of an enamel wire therethrough at a given speed. Although not shown, there is provided a guide for preventing the occurrence of flaws and feeding an enamel wire in or out past the point P. A gap S having a width H is provided between the mirrors 10, 11, so that the light for detecting a defect on the enamel wire is regularly reflected and directed outside through the gap S. Positioned on the focal points on the other side, of the mirrors 10, 11 having spheroidal reflecting surfaces are photoelectric elements 12, 13 adapted to convert the light received from the mirrors 10, 11 into electric signals. Shown at 35 is a cylindrical member secured to the undersurface of a housing lower-bracket 34. Shown at 36 is a plate which has a threaded hole adapted to mesh with a threaded lower end portion of a rod 40 having mirrors 23, 24 at its top end, the mirrors 23, 24 making an angle of 120°. The plate 36 is secured to the undersurface of the cylindrical member 35 by means of a screw 38, with a resilient material 37 being interposed between the undersurface of the cylindrical member 35 and the top surface of the plate 36. In this respect, the inclination of the mirrors 23, 24 may be given by changing an extent of the screw 38 being tightened so as to cause a lateral variation in degree of deformation of the resilient material 37. Shown at 39 is a nut. Meanwhile, the top surface of the enamel wire 1 is directly illuminated by the light which has been emitted from the light source 19 and focused through the focusing macro-lens 28, while the lower surface of the enamel 1 is illuminated by the light which has passed sidewise of the enamel wire 1, and then focused and reflected on the surfaces of the mirrors 23, 24, so that the entire surface of a minute annular zone on the circumferential surface of an enamel wire may be illuminated uniformly. In this case, if a defect is not present at the point P on the surface of the enamel wire 1, then the light thus illuminated is regularly reflected thereon so as to be directed through the gap S between the mirrors 10, 11 having spheroidal surfaces, thereby preventing the reflected light from reaching the photoelectric elements 12, 13. In case a defect is present at the point P on the surface of an enamel wire, then the light thus illuminated is reflected irregularly on the spheroidal surfaces of the mirrors 10, 11, respectively so as to be received by the photoelectric elements 12, 13. The light received by the photoelectric elements 12, 13 are converted into electric signals by the respective photoelectric elements 12, 13. Then, as shown in FIG. 7, the electric signals are each amplified by amplifiers 41, 42, and then the signals thus amplified are added by differential amplifier 43, after which the signals thus added is thresholded with respect to voltages $V_L$, $V_M$, $V_S$ in threshold circuits 44, 45, 46, thereby producing output signals 47, 48, 49. In the light that the size of a defect on the enamel wire 1 is proportional to the level of a signal added in the aforesaid differential amplifier 43, if the level of a signal exceeds the threshold voltage $V_L$, and hence there is obtained an output signal as "1" from the threshold circuit 44, then it is determined that a critical defect is present. When the level of a signal exceeds an intermediate threshold voltage $V_M$ and hence there is obtained an output signal 48 as "1" from the threshold circuit 45, then it is determined that a major defect is present. If the level of a signal exceeds a low threshold voltage $V_M$ and hence there is obtained an output signal 49 as "1" from the threshold circuit 46, then it is determined that a minor defect is present. In addition, the number of defects per given length of an enamel wire may be obtained by counting signals from the respective threshold circuits 44, 45, 46 by counter circuits 50, 51, 52. Meanwhile, there is obtained through a switch 56 a resetting signal which reads out counted values in the counter circuits 50, 51, 52 as signals 53, 54, 55 and nulifies the contents of the counter circuits 50, 51, 52.

As is apparent from the foregoing description, there is provided according to the present invention a surface-defect detecting device which is provided with: an illuminating means adapted to illuminate the entire minute annular zone on the peripheral surface of a material to be inspected, mirror having non-reflected portion in which the light that has been regularly reflected may be directed outside and or absorbed spheroidal reflecting surfaces, which are adapted to direct the irregularly reflected light on the surface of a material to be inspected, towards photoelectric elements. Thus, this may eliminate complexity in handling and signal processing due to a plurality of light sources and a plurality of photoelectric elements used in the prior art detecting device. According to the present invention, signals obtained from two photoelectric elements are added and then a defect on a material inspected is determined based on the level of signals thus added, so that the aforesaid signal processing may be simplified and defects on a material inspected may be classified or discriminated.

In addition, according to the present invention, a single light-source optical system which focuses and illuminates a minute annular zone on the surface of a material to be inspected permits the illumination of the entire surface of a material inspected, whereby maintenance and checking of the light-source optical system may be simplified, and the size of a surface-defect detecting device may be reduced half approximately.

What is claimed is:
1. A surface-defect detecting device comprising:
   illuminating means for illuminating a zone on the surface of a material to be inspected;
   reflecting means including at least a pair of reflecting surfaces for reflecting and focussing light being irregularly reflected at said illuminated zone by the presence of defects, said reflecting surfaces having first focal points at said illuminated zone and second focal points to which said irregularly reflected light is reflected by said reflecting surfaces; and
   photoelectric detecting means positioned at said second focal points for converting said irregularly reflected light into electrical signals being representative of defects on the surface of said material to be inspected.

2. A surface-defect detecting device according to claim 1, wherein said illuminated zone extends over the entire peripheral surface of said material in a first direction but extends for a limited dimension on the surface of said material in a second direction perpendicular to said first direction.

3. A surface-defect detecting device according to claim 1, wherein said reflecting surfaces are ellipsoidal or spheroidal.

4. A surface-defect detecting device according to claim 1, wherein portions of said illuminated zone which are free from defects reflect light in a direction free of said reflecting surfaces.

5. A surface-defect detecting device according to claim 1, wherein said material to be inspected is in the form of a continuous elongated member being fed through respective openings in said reflecting surfaces.

6. A surface-defect detecting device according to claim 1, wherein said illuminating means illuminates said surface of said material to be inspected in a plane perpendicular to an axis of said material.

7. A surface-defect detecting device comprising:
illuminating means for illuminating a zone on the surface of a material to be inspected;
reflecting means including at least a pair of reflecting surfaces for reflecting and focussing light being irregularly reflected at said illuminated zone by the presence of defects, said reflecting surfaces having first focal points at said illuminated zone and second focal points to which said irregularly reflected light is reflected by said reflecting surfaces;
photoelectric means including photoelectric elements positioned at said second focal points for converting said irregularly reflected light which is focussed by said reflecting surfaces into electrical output signals;
adding circuit means for adding respective electrical output signals from said photoelectric elements to provide added output signals, and
threshold circuit means for comparing said added output signals with signals representative of predetermined threshold levels to produce respective comparison output signals representative of a given size of defects on said surface of said material to be inspected.

8. A surface-defect detecting device according to claim 7, wherein at least three threshold levels are provided.

9. A surface-defect detecting device according to claim 7, wherein said material to be inspected has a surface being continuously linearly illuminated with said material being continuously fed through openings in said reflecting surfaces, and wherein counter circuit means are provided to count the number of said comparison output signals such that the number of defects on said surface of said material to be inspected are determined.

10. A surface-defect detecting device according to claim 7, wherein said illuminated zone extends over the entire peripheral surface of said material in a first direction but extends for a limited dimentions on the surface of said material in a second direction perpendicular to said first direction.

11. A surface-defect detecting device according to claim 7, wherein said reflecting surfaces are ellipsoidal or spheroidal.

12. A surface-defect detecting device according to claim 7, wherein portions of said illuminated zone which are free from defects reflect light in a direction free of said reflecting surfaces.

13. A surface-defect detecting device comprising:
illuminating means for illuminating a material to be inspected, said illuminating means including
light source means for emitting illuminating light,
optical focussing means for focussing said illuminating light onto a zone on the surface of said material to be inspected, and
first reflecting means including at least a pair of mirrors disposed at a position relative to said material to be inspected which is opposite to incident light from said optical focussing means for uniformly illuminating said surface of said material to be inspected from three directions such that a continuous illuminated zone about the surface of said material is produced, said pair of mirrors each being inclined substantialy at 60° to the optical axis of said incident light,
second reflecting means having non-reflecting portions for substantially removing regularly reflected light which has been reflected by portions of said illuminated zone free of defects, and said second reflecting means having at least a pair of reflecting surfaces for reflecting and focussing light being irregularly reflected at said illuminated zone by the presence of defects, said reflecting surfaces having first focal points at said illuminated zone and second focal points to which said irregularly reflected light is reflected by said reflecting surfaces; and
photoelectric detecting means positioned at said second focal points for converting said irregularly reflected light into electrical signals being representative defects on the surface of said material to be inspected.

14. A surface-defect detecting device according to claim 13, wherein said optical focussing means includes a slit for limiting or condensing the range of incident light being focussed by said optical focussing means on said zone.

15. A surface-defect detecting device according to claim 13, wherein said illuminated zone extends over the entire peripheral surface of said material in a first direction but extends for a limited dimension on the surface of said material in a second direction perpendicular to said first direction.

16. A surface-defect detecting device according to claim 13, wherein said reflecting surfaces are ellipsoidal or spheroidal.

17. A surface-defect detecting device for detecting defects or irregularities at a peripheral surface of a sample to be inspected having an elongated axis, the surface of said sample extending in parallel with the axis thereof, said device comprising:
illuminating means including a light source for projecting a light beam from said light source and formed into a shape having a limited axial extent on the peripheral surface of said sample, so that a thin band-shaped zone is uniformly illuminated on said surface of said sample;
at least one mirror having shell with a reflecting surface on an inner face of said shell and a non-reflecting portion, said mirror having first and second focal points and being disposed in such a manner that said first focal point is positioned on the band-shaped zone of said sample and that an axis of said mirror in which said first and second focal points are positioned intersects the axis of said sample, and said non-reflecting portion of said mirror being positioned at a band-shaped area on said shell for removing light which has been regularly reflected on the band-shaped zone of said sample; and
a photoelectric element positioned at the second focal point of said mirror for receiving light reflected from the reflecting surface of said mirror and converting the light thus received into electric signals;

whereby light irregularly reflected at the band-shaped zone of said sample is focussed by means of said mirror on the photoelectric element, said photoelectrical element providing an electrical output signal which is a summation.

18. A surface-defect detecting device according to claim 17, wherein said illuminating means includes a plurality of light sources and lenses for projecting the light beams on the peripheral surface of the sample so as to form the band-shaped zone around the sample.

19. A surface-defect detecting device according to claim 17, wherein two of said mirrors are provided each having spheroidal reflecting surfaces, respective axes of said two mirrors coinciding with each other, and the second focal points of said two mirrors being symmetrically positioned on the axes thereof with respect to the first focal points of said mirrors which coincide with each other.

20. A surface-defect detecting device according to claim 17, wherein said illuminating means includes a lens and reflection mirrors for reflecting the light beam and for projecting the light beam on different portions of said surface of said sample from that directly projected on said surface, so that said band-shaped zone is continuously formed around the sample.

21. An optical surface-defect detecting device, especially for inspecting an enamel wire or the like, the surface of the sample being illuminated by a light source according to a pattern and the variations in the intensity of the light reflected by the surface, which occur in the event of irregularities at the surface of the sample, being detected by photoelectric elements, characterized by the combination of the features that a. light emanating from at least one light source is focussed by an optical system onto the surface of the sample in a plane perpendicular to an axis of the sample, so that a minute band-shaped zone on the peripheral surface of the sample is uniformly illuminated; and b. at least two mirrors having spheroidal reflecting surfaces are disposed in such a manner that one focal point of each spheroidal mirror is positioned at the band-shaped zone of the sample, and the second focal point of each spheroidal mirror coincides with a photoelectric element, so that light irregularly reflected at the band-shaped zone is focussed by means of the two spheroidal mirrors onto the two photoelectric cells to provide electrical outputs which are summed up;

c. said spheroidal mirrors including non-reflecting portions to remove the light which has been regularly reflected at the band-shaped zone of the sample.

22. A surface-defect detecting device according to claim 21, wherein said sample is capable of being fed in the form of a continuous member through a hole provided in each of said mirrors.

23. A surface-defect detecting device according to claim 21, wherein an adding circuit is provided for summing the output signals from said photoelectric elements; and at least one threshold circuit is provided for comparing the output signal from said adding circuit with at least three given threshold levels.

24. A surface-defect detecting device according to claim 23, wherein the number of pulses obtained from said threshold circuit is counted by a counter circuit, and said sample is fed through a hole in each mirror.

25. A surface-detecting device according to claim 21, wherein a focussing optical system is provided for focussing the light of said light source on said minute band-shaped zone of the surface of said sample; and said two mirrors are positioned on the side of said sample opposite to said focussing optical system, said mirrors being inclined substantially at 60° to the optical axis of said incident light.

26. A surface-defect detecting device according to claim 25, wherein focussing optical system is provided with a slit for limiting the range of light focussed through said focussing optical system on said minute band-shaped zone of the surface of said sample.

* * * * *